United States Patent [19]

Kim et al.

[11] Patent Number: 4,557,924
[45] Date of Patent: Dec. 10, 1985

[54] METHOD OF PRODUCING CRYSTALLINE AMMONIUM METATUNGSTATE

[75] Inventors: Tai K. Kim, Towanda; Robert P. McClintic, Monroeton, both of Pa.

[73] Assignee: GTE Products Corporation, Stamford, Conn.

[21] Appl. No.: 714,295

[22] Filed: Mar. 21, 1985

[51] Int. Cl.$^4$ ............................................. C01G 41/00
[52] U.S. Cl. .................................................... 423/593
[58] Field of Search ......................................... 423/593

[56] References Cited

U.S. PATENT DOCUMENTS

| | | | |
|---|---|---|---|
| 3,175,881 | 3/1965 | Chinola et al. | 423/593 |
| 3,857,928 | 12/1974 | Kim et al. | 423/593 |
| 3,859,929 | 12/1974 | Quatrini et al. | 423/593 |
| 3,936,362 | 2/1976 | Vanderpool et al. | 423/593 |
| 3,956,474 | 5/1976 | Ritsko | 423/593 |
| 4,504,461 | 3/1985 | Carpenter et al. | 423/593 |

Primary Examiner—H. T. Carter
Attorney, Agent, or Firm—Donald R. Castle

[57] ABSTRACT

A method is disclosed for producing crystalline ammonium metatungstate from ammonium paratungstate. The method involves heating the ammonium paratungstate at from about 130° to about 400° C. for from about 1 to about 8 hours to remove some ammonia and water, and heating a slurry of the resulting heated ammonium paratungstate in water at from about 80° to about 100° C. at relatively constant volume until the pH of the slurry becomes stabilized at from about 5.8 to about 6.0. The pH of the resulting pH stabilized slurry is then adjusted to from about 4.2 to about 3.0 by introducing a porous container containing a strongly acidic cation exchange resin into the slurry, the amount of resin being essentially sufficient to accomplish the pH adjustment. Thereafter the container and resin are removed from the resulting pH adjusted slurry which is then digested at from about 80° to about 100° C. for from about 2 to about 6 hours at relatively constant volume to form a solution of ammonium metatungstate. The solution is then evaporated to a fraction of its original volume to concentrate it. Any insoluble material is then separated from the solution, and ammonium metatungstate is crystallized from the solution.

3 Claims, No Drawings

4,557,924

METHOD OF PRODUCING CRYSTALLINE AMMONIUM METATUNGSTATE

FIELD OF THE INVENTION

This invention relates to an improved method for producing ammonium metatungstate. More particularly, it relates to a method for producing ammonium metatungstate in crystalline form using ammonium paratungstate as the starting material.

BACKGROUND OF THE INVENTION

Tungsten, generally in the form of tungsten oxide, $WO_3$, is useful as a component of a variety of catalysts for chemical reactions. In most cases in the manufacture of these catalysts it is necessary at some stage to provide a water soluble tungsten compound from which the tungsten oxide is derived. For example, certain types of catalysts comprise porous carriers such as, for example, alumina impregnated with compounds of catalytic elements such as tungsten. In the preparation of such catalysts the carrier materials are immersed, or slurried, in solutions of the compounds of the catalytic elements and then dried, leaving the catalyst compound intimately associated with the carrier. Ammonium metatungstate, $(NH_4)_6H_2W_{12}O_{40} \times H_2O$ is a particularly useful solute in such solutions. It offers the advantage of being readily soluble in water and, in addition, it decomposes readily on heating to leave the desired catalytic residue of tungsten oxide in the carrier. Alkali metal salts of the tungstates are also water soluble, but their use in catalyst manufacture is restricted by the fact that the presence of residual alkali metals frequently is objectionable in catalytic materials.

It has been proposed to obtain ammonium metatungstate solutions by baking crystalline ammonium paratungstate at temperatures of the order of 500° F. to drive off ammonia and to then dissolve the product of the baking operation in water. As is well known, a certain amount of ammonium metatungstate is produced by such a baking operation. However, thermogravimetric studies of this process have demonstrated that the ammonium paratungstate is not converted entirely to ammonium metatungstate at any particular temperature, nor after any particular baking time. To the contrary, other degradation products, particularly insoluble tungsten oxide also are continuously formed during the baking. In addition, certain amounts of unconverted ammonium paratungstate remain. As a result, substantial amounts of insoluble tungsten oxide and also ammonium paratungstate, which is only slightly soluble, remain undissolved when it is attempted to dissolve the product of the baking operation, making it necessary to filter the solution before use, and discard or reprocess the insoluble materials. Also, as indicated above, the small amount of paratungstate remaining in solution may complicate the use of the solution because of its tendency to precipitate out with temperature changes or evaporation of the water.

U.S. Pat. No. 3,591,331 discloses a process for producing ammonium metatungstate without an appreciable formation of ammonium paratungstate The process comprises contacting an aqueous ammonium tungstate solution having a pH of at least about 9 with an organic extractant solution comprising di-2-ethylhexyl phosphoric acid, and a water insoluble hydrocarbon solvent, the components being in specified ratios to extract ammonium ions from the aqueous solution, separating the resultant aqueous solution from the organic solution, heating the aqueous solution to a temperature of at least about 60° C. for at least about 1 hour and recovering an essentially pure ammonium metatungstate.

U.S. Pat. No. 3,857,928 discloses a process for producing crystalline ammonium metatungstate from ammonium tungstate solution by introducing the ammonium tungstate solution into an ion exchange column containing a weak acid (carboxylic group) cation exchange resin, and collecting the effluent from the column until a pH of about 3.5 is reached. The effluent solution is then digested at about 98° C. for about 5 hours, followed by crystallization of ammonium metatungstate by conventional processes, such as, evaporation or spray drying.

U.S. Pat. No. 3,956,474 discloses a process for producing ammonium metatungstate from ammonium tungstate which involves the addition of about 3.6% by weight of silica to an ammonium tungstate solution, digestion for at least about 4 hours at a temperature of at least about 98° C. followed by filtration to remove silica from the ammonium metatungstate solution. Typically about 0.4% by weight of silica remains after filtering. The resulting ammonium metatungstate solution may be further processed to recover solid ammonium metatungstate, such as by evaporation or spray drying.

U.S. Pat. No. 3,936,362 discloses a process for producing ammonium metatungstate and other species by passing tungstate ions through an anion exchange membrane into an aqueous solution containing ammonium cations under the driving force of an electrical potential for a time sufficient to achieve a pH within the range in which the desired tungsten compound will form.

U.S. Pat. No. 3,175,881 discloses a method for producing crystalline ammonium metatungstate from ammonium paratungstate by heating the ammonium paratungstate to the point at which a slurry containing about 9% by weight of material exhibits a pH of from about 3 to about 5, followed by evaporation of the slurry to about one-third of its original volume, filtering the concentrated slurry and then crystallizing ammonium paratungstate. Based on the $WO_3$ contents of the ammonium paratungstate starting material and the ammonium metatungstate produced, the yield is about 78.1%. A method of producing crystalline ammonium metatungstate from ammonium paratungstate in higher yields than this would be desirable.

U.S. Pat. No. 3,857,929 discloses a process for producing crystalline ammonium metatungstate from ammonium tungstate solution by introducing a strong acid cation exchange resin containing sulphonic group batchwise into an ammonium tungstate solution until a pH of about 3.5 is reached. The resin is then removed by filtration and the filtered solution is digested at about 98° C. for at least about 5 hours, followed by crystallization of ammonium metatungstate by conventional processes as evaporation or spray drying. A method of producing crystalline ammonium metatungstate without the extra handling of the resin that results from batchwise addition of the resin would be desirable.

SUMMARY OF THE INVENTION

In accordance with one aspect of this invention, there is provided a method of producing ammonium metatungstate from ammonium paratungstate. The method involves heating the ammonium paratungstate at from about 130° to about 400° C. for from about 1 to about 8 hours to remove some ammonia and water, and heating a slurry of the resulting heated ammonium paratungstate in water at from about 80° to about 100° C. until the pH of the slurry becomes stabilized at from about 5.8 to about 6.0. The pH of the resulting pH stabilized slurry is then adjusted to from about 4.2 to about 3.0 by introducing a porous container containing a cation exchange resin into the slurry, the amount of resin being essentially sufficient to accomplish the pH adjustment. Thereafter the container and resin are removed from the resulting pH adjusted slurry which is then digested at from about 80° C. to about 100° C. for from about 2 to about 6 hours at relatively constant volume to form a solution of ammonium metatungstate. The solution is then evaporated to a fraction of its original volume to concentrate it. Any insoluble material is then separated from the solution, and ammonium metatungstate is crystallized from the solution.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

By the process of this invention, crystalline ammonium metatungstate is produced from ammonium paratungstate in high yields.

Commercially available ammonium paratungstate which has the generally accepted formula $(NH_4)_{10}H_2W_{12}O_{41}\cdot XH_2O$ is first heated or calcined to drive off ammonia and water vapor.

Heating conditions depend to a certain extent on the type and manner of operation of the apparatus employed. The calcination operation can be carried out in a continuous rotary calciner. Typically, using a rotary calciner, residence times of the order of about 6 hours normally are sufficient to drive off the proper amount of ammonia and water vapor from the ammonium paratungstate. Although various combinations of temperatures, residence times, and types of apparatus can be employed in the calcination, it has been found that the extent to which the calcination of the ammonium paratungstate is carried out is relatively critical. More particularly, if the material should be overcalcined, an excessive quantity of free tungsten oxide is produced. At least a substantial portion of this may not be dissolved or converted to the soluble metatungstate in the subsequent digestion step, and represents a loss of yield. On the other hand, insufficient calcination can result in a substantial residue of difficulty soluble ammonium paratungstate which can be lost along with the tungsten oxide in the subsequent digestion step or can remain as an undesirable contaminant of the crystalline ammonium metatungstate product.

By the process of this invention, the heating compositions are designed to give a weight loss of from about 5.5% to about 7.5%. In this weight loss range, the resulting heated ammonium paratungstate can be converted to ammonium metatungstate in the subsequent digestion step at high efficiencies. With the rotary calciner, the heating conditions found to be satisfactory are from about 4 hours to about 8 hours at about 140° C. to about 400° C. with from about 1 hours to about 2 hours at from about 130° C. to about 160° C. being preferred.

The heating can also be done in a multiple hearth furnace. This multiple stage heating has the advantage of more uniform heating of the material so that the formation of overcalcined and undercalcined portions of the material is essentially avoided.

A multiple hearth furnace which can be used in the operation of this invention is a plate dryer which is a continuously operating contact dryer suitable for handling free flowing, non-caking, trickling, powdery, or granular products. Plate dryers manufactured by Krauss Maffei are especially suitable. According to the literature provided by Krauss Maffei, the plate dryer consists of a number of drying plates placed one above the other and spaced apart. Its specific characteristics are the mechanical product conveying and the low velocity of purging gases and/or vapors which avoids excessive dust formation and permits the handling of very fine products and those with a wide particle distribution. In general, the plate dryer operates by allowing the moist product to trickle from a feed mechanism such as a bucket wheel, etc. onto the top plate. A rotating raking system which consists of rakes positioned on each plate, conveys the drying product in a spiralic pattern through several revolutions to and over the outer rim of the first plate. Here the product trickles to the next plate below, where it is conveyed to the center of the plate in the same manner as before. The transportation operation repeats itself according to the number of plates. During its contact with the heated plate surface, the product is drying. The vapors are exhausted or discharged by purging gases (air or inert gas) flowing transversely across the plates. Each plate can be heated individually, thus allowing a temperature profile exactly suited to the product and process. Heating media are steam, hot water, or heat transfer fluids.

Another multiple hearth furnace is the Turbo Dryer, in particular one manufactured by Wyssmont, of Fort Lee, N.J. According to the literature provided by Wyssmont, the Turbo Dryer has only two moving parts: the tray/shelf assembly and the fan assembly. Wet feed enters the dryer through a feed chute in the roof of the housing and flows onto the first shelf. The shelves are circular with cut out center and radial slots. The shelves are rigidly mounted on an inner supporting frame forming a vertical stack which rotates slowly as a unit. Material flows onto each shelf from the one above, forming a pile. The rotation of the tray/shelf assembly carries the freshly formed pile past a stationary blade set to level the pile to fill the tray at a uniform height. At the end of a revolution, the tray segment meets a secondary stationary blade set to wipe the tray clean of material. The material is held stationary by the wiper blade while the tray continues its rotation. The material flows through a radial slot on to the shelf below where the cycle is repeated. Material progresses downward from shelf to shelf through the dryer and is discharged through a chute in the housing bottom. Air or other drying medium is fed to the dryer through a side mounted vertical manifold with control dampers. Air movement inside the dryer is provided by centrifugal fans mounted on a single vertical shaft. The fan assembly fits in the center of the shelf assembly and rotates independently of the shelves. The drying medium leaves the dryer through a roof exhaust.

Any such multiple hearth furnace can be used, as long as the proper heating conditions can be attained. Although heating conditions as temperature, residence time, bed depth, number of stages or hearths, etc., can vary depending on the particular furnace or dryer used the following conditions should be met. In general, heating temperatures are from about 200° C. to about 400° C. with from about 260° C. to about 370° C. being preferred. The material bed depth is maintained generally at from about ⅛ inch to about 2½ inches with from about ¾ inches to about 1½ inches being preferred. The bed of material is gently, and continuously agitated. The flow of heated air through the furnace is closely regulated to from about ¾ to about 2 cubic feet of air per pound of ammonium paratungstate. The residence time, of course, varies with the above conditions. The heating conditions are designed to give the desired weight losses which were described previously.

A slurry is then formed of the heated ammonium paratungstate in water, preferably deionized water with generally from about 20 to about 40 parts of the ammonium paratungstate in from about 80 to about 60 parts of water. Although the method can be carried out with larger proportions of water, obvious inefficiencies are introduced because of the necessity of evaporating the excess water. Slightly smaller quantities of water can also be used but the subsequent digestion step may then not adequately convert any residual paratungstate to the metatungstate, the result being lower yields or contaminated product. Preferably the water is preheated to from about 60° C. to about 80° C. before the calcined material is added to it.

When the heated ammonium paratungstate is first added to the water, there can be evolution of some ammonia resulting in a fluctuation in pH. When the slurry is heated, preferably at from about 80° C. to about 100° C., the pH is stabilized at from about 5.8 to about 6.0.

In order for the metatungstate structure to form in the subsequent digestion step, the pH must be from about 4.2 to about 3.0, preferably from about 3.9 to about 3.2. The pH of the stabilized slurry is therefore adjusted to this range by introducing a strongly acidication exchange resin into the slurry. Use of a resin is advantageous over addition of a mineral acid because with the resin, there is no aniomic contamination of the slurry. A preferred resin is manufactured by Rohm and Haas Company under the name of Amberlite IR-120 which is a sulfonic type cation exchange resin. A hydrogen ion of the resin is exchanged for a dissolved ammonium ion in the slurry and the pH of the slurry therefore drops. The amount of resin that is added is sufficient to drop the pH to the desired range. If more resin is added than is needed for this purpose, the pH drops below the desired range and irreversible formation of tungstic acid takes place and the result is loss of yield. Therefore, it is imperative that the proper amount of resin be added. Generally, from about 0.10 to about 0.20 milliequivalents of resin is added per milliequivalent of $WO_3$.

U.S. Pat. No. 3,857,929 teaches batchwise addition of the resin. After the pH adjustment, the resin must be removed from the solution or slurry by filtration or decantation. This handling is time consuming.

By the present invention, the proper amount of resin is introduced into the solution in a porous container. The openings in the container should be large enough to allow the exchange of hydrogen ions and ammonium ions, but small enough to prevent the resin from escaping into the slurry. The preferred container is a nylon bag. The container with the resin is allowed to remain in contact with the slurry, the slurry preferably being agitated to allow maximum contact of the sites of the resin with the slurry. During the course of the cation exchange and pH adjustment, the proper ratio of ammonia to tungsten is being attained so that in the subsequent digestion step the tungstate is efficiently converted to the crystalline ammonium metatungstate structure. If, during the course of the pH adjustment, the pH should stabilize above the desired range, a slight amount of resin can be added, until the desired range is attained. When the pH has stabilized in the desired range, the container with the spent resin is removed from the slurry.

In order for the tungstate in the pH adjusted slurry to be converted to the ammonium metatungstate structure, the slurry must be digested for at least about 2 hours at a temperature of at least about 80° C. In general the digestion is carried out at from about 80° C. to about 100° C., and preferably from about 90° C. to about 100° C. for from about 2 hours to about 6 hours, preferably for from about 25 hours to about 35 hours.

U.S. Pat. No. 3,175,881, while teaching the formation of ammonium metatungstate by evaporating followed by obtaining crystalline ammonium metatungstate from a solution of heated ammonium paratungstate in water, does not teach the digestion conditions needed for conversion to the ammonium metatungstate structure which results in high yields of crystalline ammonium metatungstate.

By the process of the present invention, the entire digestion can be carried out at relatively constant volume. Or, more preferably for economic purposes, about the first 3 hours of the digestion can be carried out at relatively constant volume while the remaining time that is needed for conversion can be accumulated while the slurry is being concentrated by evaporation so that part of the digestion and evaporation step can be carried out simultaneously. Upon completion of the digestion, a solution of ammonium metatungstate is produced along with a possibly minor amount of insoluble material which can be impurities or insoluble tungsten compounds.

The ammonium metatungstate solution is concentrated by evaporation to a fraction, preferably about one-third of its original volume. As was explained previously, the evaporation can be carried out at a point in the digestion so that when the final volume is reached, the slurry (being converted to a solution), will have been subjected to the required digestion conditions of time and temperature for conversion to the ammonium metatungstate structure.

The concentration of the final ammonium metatungstate solution is generally from about 600 to about 800 grams of $WO_3$ per liter. Any insoluble material is then separated from the final concentrated ammonium metatungstate solution by any standard technique such as filtration. The insolubles can be water washed to recover any soluble tungsten and the resulting wash solution used in subsequent operations.

Crystalline ammonium metatungstate can then be recovered from the concentrated solution by any conventional manner such as by further evaporation or by spray drying.

Based on the $WO_3$ content of the starting ammonium paratungstate and the ammonium metatungstate produced, the yield is at least about 95%.

The resin can be regenerated for reuse by removing the ammonium ions. This is accomplished by contacting the resin with a mineral acid stripping solution. The hydrogen ions of the mineral acid are exchanged for the ammonium ions of the resin. The preferred mineral acid is hydrochloric acid having a concentration of from about 5 to about 10% by weight.

To more fully illustrate this invention, the following non-limiting example is presented. All parts, portions, and percentages are on a weight basis unless otherwise stated.

EXAMPLE

About 410 parts of ammonium paratungstate which had been heated in a conventional oven and with a weight loss of about 6% is slurried in about 1500 parts of deionized water. The slurry is heated to about 95° to about 100° C. and the volume of the slurry is kept relatively constant. The heating of the slurry is continued until the pH is stabilized at from about 5.8 to about 6.0. The pH is then adjusted to about 3.5 by introducing a nylon bag containing about 0.18 milliequivalents of resin per milliequivalent of $WO_3$ which in this example is about 10 milliliters of resin. The resin is a strongly acidic cation resin on the $H^+$ cycle, Amberlite IR 120 made by Rohm and Haas Company. The pH first changes to about 3.77. After about 10 minutes at a temperature of about 98° C., the pH reaches about a 3.89. About another 0.09 milliequivalents of resin per milliequivalent of tungsten which in this example is about 5 milliliters of resin, is then added to drop the pH to about 3.19. The slurry is then digested for about one hour and 50 minutes at about 98° C. to give a total of about two hours digestion time at relatively constant volume. After this digestion period, the volume of the slurry is decreased to about one-third of its original volume by boiling. The resulting concentrated slurry is then filtered and the precipitate is washed with about 250 parts of deionized water in order to remove water soluble ammonium metatungstate. The ammonium metatungstate product is then isolated by crystallization from the resulting filtrate. The recovery of tungsten as ammonium metatungstate is about 97.5%. While there has been shown and described what are at present considered the preferred embodiments of the invention, it will be obvious to those skilled in the art that various changes and modifications may be made therein without departing from the scope of the invention as defined by the appended claims.

What is claimed is:

1. A method of producing ammonium metatungstate from ammonium paratungstate, said method comprising:
   (a) heating said ammonium paratungstate at from about 130° C. to about 400° C. for from about 1 hour to about 8.0 hours to remove some ammonia and some water and form a heated ammonium paratungstate;
   (b) forming a slurry of said heated ammonium paratungstate and water;
   (c) heating said slurry at from about 80° C. to about 100° C. at relatively constant volume until the pH of said slurry becomes stabilized at from about 5.8 to about 6.0;
   (d) adjusting the pH of the resulting pH stabilized slurry to from about 4.2 to about 3.0 by introducing a porous container containing a strongly acidic cation exchange resin into the slurry, the amount of said resin being essentially sufficient to extract sufficient dissolved ammonium ions from the slurry to accomplish the pH adjustment;
   (e) removing the container and resin from the resulting pH adjusted slurry;
   (f) digesting the resulting pH adjusted slurry at from about 80° C. to about 100° C. for from about 2 hours to about 6 hours to form a solution of ammonium metatungstate;
   (g) evaporating said solution to a fraction of its original volume to form a relatively concentrated ammonium metatungstate solution;
   (h) separating any insoluble material from said concentrated ammonium metatungstate solution; and
   (i) crystallizing ammonium metatungstate from said concentrated ammonium metatungstate solution.

2. A method according to claim 1 wherein from about 0.10 to about 0.20 milliequivalents of resin per milliequivalent of $WO_3$ is used to adjust the pH.

3. A method according to claim 1 wherein at least about 95% by weight of tungsten in said ammonium paratungstate is converted to ammonium metatungstate.

* * * * *